United States Patent
Taylor et al.

(10) Patent No.: US 11,702,981 B1
(45) Date of Patent: Jul. 18, 2023

(54) TURBINE ENGINE BLEED WASTE HEAT RECOVERY

(71) Applicant: RAYTHEON TECHNOLOGIES CORPORATION, Farmington, CT (US)

(72) Inventors: Stephen H. Taylor, East Hartford, CT (US); Alan Retersdorf, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/724,904

(22) Filed: Apr. 20, 2022

(51) Int. Cl.
*F02C 6/08* (2006.01)
*F02C 9/18* (2006.01)
*F02C 3/10* (2006.01)
*F02C 7/14* (2006.01)
*F02C 7/18* (2006.01)
*F02C 7/36* (2006.01)

(52) U.S. Cl.
CPC .............. *F02C 6/08* (2013.01); *F02C 3/10* (2013.01); *F02C 7/14* (2013.01); *F02C 7/18* (2013.01); *F02C 9/18* (2013.01); F02C 7/36 (2013.01)

(58) Field of Classification Search
CPC ...... F02C 6/08; F02C 7/14; F02C 7/18; F02C 7/185; F02C 9/18; F02C 3/13
See application file for complete search history.

(56) References Cited

U.S. PATENT DOCUMENTS

| | | | | | |
|---|---|---|---|---|---|
| 3,765,170 | A | * | 10/1973 | Nakamura | F02C 6/003 60/39.17 |
| 3,893,292 | A | * | 7/1975 | Amann | F02C 9/18 60/39.27 |
| 4,147,024 | A | * | 4/1979 | Moellmann | F02C 7/10 60/39.15 |
| 4,302,148 | A | * | 11/1981 | Tubbs | F01D 5/08 415/117 |
| 4,657,482 | A | * | 4/1987 | Neal | F01D 5/082 415/176 |
| 5,154,048 | A | * | 10/1992 | Ponziani | F01D 5/08 415/107 |

(Continued)

FOREIGN PATENT DOCUMENTS

CN 106882390 B 6/2020
KR 101294146 B1 8/2013

*Primary Examiner* — William H Rodriguez
(74) *Attorney, Agent, or Firm* — Carlson, Gaskey & Olds, P.C.

(57) ABSTRACT

A gas turbine engine assembly includes a core engine that includes a core flow path where a core airflow is compressed in a compressor section, communicated to a combustor section, mixed with fuel and ignited to generate a high energy combusted gas flow that is expanded through a turbine section, a first tap at a location up stream of the combustor section for communicating a portion of the core airflow as a bleed airflow downstream of the combustor section, a heat exchanger that places the bleed airflow that is communicated from the first tap in thermal communication with the high energy combusted gas flow downstream of the combustor section, and a power turbine that is configured to generate shaft power from expansion of the (Continued)

heated bleed airflow, the power turbine includes an inlet that is configured to receive the heated bleed airflow from the heat exchanger.

24 Claims, 6 Drawing Sheets

(56) References Cited

U.S. PATENT DOCUMENTS

| | | | | |
|---|---|---|---|---|
| 5,167,484 | A * | 12/1992 | Ponziani | F01D 9/065 |
| | | | | 415/104 |
| 5,363,641 | A * | 11/1994 | Dixon | F02C 6/08 |
| | | | | 60/788 |
| 5,414,992 | A | 5/1995 | Glickstein | |
| 5,452,573 | A * | 9/1995 | Glickstein | F02C 6/08 |
| | | | | 60/785 |
| 5,630,700 | A * | 5/1997 | Olsen | F01D 9/042 |
| | | | | 415/209.2 |
| 5,979,183 | A * | 11/1999 | Smith | F25J 3/04018 |
| | | | | 60/39.12 |
| 6,250,061 | B1 * | 6/2001 | Orlando | F02C 7/18 |
| | | | | 60/772 |
| 6,253,554 | B1 * | 7/2001 | Kobayashi | F02C 7/224 |
| | | | | 60/736 |
| 6,644,035 | B1 * | 11/2003 | Yamanaka | F02C 7/185 |
| | | | | 60/806 |
| 6,792,762 | B1 * | 9/2004 | Yamanaka | F02C 7/185 |
| | | | | 60/785 |
| 11,208,959 | B2 * | 12/2021 | Huang | F02C 3/30 |
| 11,225,905 | B1 | 1/2022 | Holley et al. | |
| 11,459,906 | B2 * | 10/2022 | Ortiz | F01D 17/145 |
| 2013/0055724 | A1 * | 3/2013 | Finney | F01D 25/12 |
| | | | | 60/785 |
| 2015/0207382 | A1 * | 7/2015 | Lenk | F02C 6/18 |
| | | | | 290/2 |
| 2015/0275769 | A1 * | 10/2015 | Foutch | F02C 7/047 |
| | | | | 60/776 |
| 2016/0376960 | A1 * | 12/2016 | Reed | F01N 3/2066 |
| | | | | 60/39.17 |
| 2017/0058770 | A1 * | 3/2017 | Vandale | F02C 3/13 |
| 2017/0167378 | A1 * | 6/2017 | Klosinski | F01K 17/02 |
| 2017/0167379 | A1 * | 6/2017 | Scipio | F01D 25/305 |
| 2021/0348564 | A1 * | 11/2021 | Mackin | B64D 33/02 |

* cited by examiner

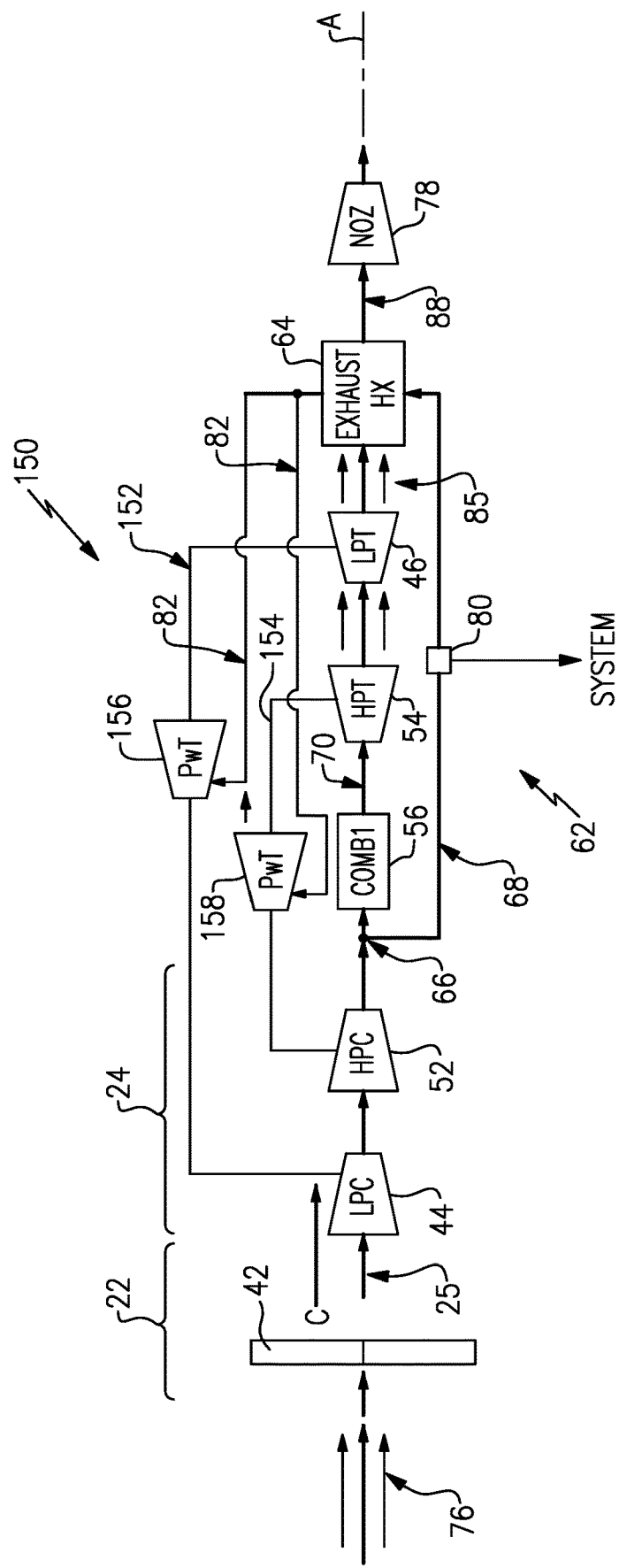
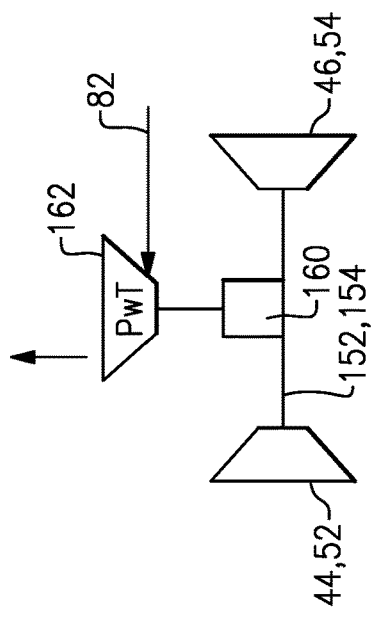
FIG.7
FIG.8

TURBINE ENGINE BLEED WASTE HEAT RECOVERY

TECHNICAL FIELD

The present disclosure relates generally to a turbine engine including a waste heat recovery system for capturing thermal energy to perform useful work.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine.

Turbine engine manufacturers continue to seek further improvements to engine performance including improvements to reduce environmental impact while improving thermal and propulsive efficiencies.

SUMMARY

A gas turbine engine assembly according to an exemplary embodiment of this disclosure, among other possible things includes a core engine that includes a core flow path where a core airflow is compressed in a compressor section, communicated to a combustor section, mixed with fuel and ignited to generate a high energy combusted gas flow that is expanded through a turbine section, a first tap at a location up stream of the combustor section for communicating a portion of the core airflow as a bleed airflow downstream of the combustor section, a heat exchanger that places the bleed airflow that is communicated from the first tap in thermal communication with the high energy combusted gas flow downstream of the combustor section, and a power turbine that is configured to generate shaft power from expansion of the heated bleed airflow, the power turbine includes an inlet that is configured to receive the heated bleed airflow from the heat exchanger.

In a further embodiment of the foregoing, the compressor section includes a high-pressure compressor that is disposed upstream of the combustor section and the first tap is located downstream of the high-pressure compressor and upstream of the combustor section.

In a further embodiment of any of the foregoing, the turbine section includes a high-pressure turbine and a low-pressure turbine. The heat exchanger is disposed downstream of the low-pressure turbine.

In a further embodiment of any of the foregoing, the gas turbine engine includes a generator that is coupled to the power turbine. Rotation of the power turbine is provided by expansion of the heated bleed airflow that drives the power turbine and thereby the generator.

In a further embodiment of any of the foregoing, a power turbine includes an outlet that exhausts expanded heated bleed airflow to atmosphere.

In a further embodiment of any of the foregoing, the gas turbine engine includes a first control device that is configured to control flow of the bleed airflow through the tap. In a first operating condition the first control device prevents flow through the tap and in a second operating condition the first control device provides for flow through the tap.

In a further embodiment of any of the foregoing, the gas turbine engine includes a controller that is programmed to control operation of the first control device in response to a control input.

In a further embodiment of any of the foregoing, the control input is indicative of an engine operating condition being one of a taxi condition, takeoff condition, a climb condition, a cruise condition or a descend condition.

In a further embodiment of any of the foregoing, the gas turbine engine includes a second power turbine that is configured to generate shaft power from expansion of a portion of the bleed airflow.

In a further embodiment of any of the foregoing, the second power turbine is coupled to drive a power conversion device through a second shaft.

In a further embodiment of any of the foregoing, the compressor section includes a low-pressure compressor upstream of a high-pressure compressor and a second tap is disposed at a location downstream of the low-pressure compressor upstream of an outlet of the high-pressure compressor.

In a further embodiment of any of the foregoing, the gas turbine engine includes a first control device to control flow through the first tap and a second control device that controls flow through the second tap and a controller controls operation of the first control device and the second control device based on a control input.

In a further embodiment of any of the foregoing, the first tap is in communication with a turbine cooling air system and a portion of the bleed airflow is communicated to the turbine cooling air system.

In a further embodiment of any of the foregoing, the power turbine is coupled to a shaft of the core engine.

In a further embodiment of any of the foregoing, the gas turbine engine includes a coupling device that is configured to couple the power turbine to the shaft of the core engine.

An auxiliary power generation system for a turbine engine assembly according to an exemplary embodiment of this disclosure, among other possible things includes a first tap that is configured to receive a portion of a core airflow as a bleed airflow and communicates the bleed airflow downstream of a combustor section of a turbine engine assembly, a heat exchanger placing the bleed airflow that is communicated from the first tap in thermal communication with a high energy combusted gas flow downstream of the combustor section, a power turbine that is configured to drive an output shaft from expansion of the heated bleed airflow, the power turbine includes an inlet that is configured to receive the heated bleed airflow from the heat exchanger, and a power generation device that is coupled to the output shaft of the power turbine.

In a further embodiment of the foregoing, the power generation device is a generator that is configured to produce electric power when rotated by the power turbine.

In a further embodiment of any of the foregoing, the power turbine is coupled to a shaft of a turbine engine assembly.

In a further embodiment of any of the foregoing, the auxiliary power generation system includes a coupling device that is configured to couple the power turbine to the shaft of the turbine engine assembly.

In a further embodiment of any of the foregoing, power turbine includes an outlet that exhausts expanded heated bleed airflow to atmosphere.

In a further embodiment of any of the foregoing, the auxiliary power generation system includes a second tap that is configured to receive a portion of the core airflow as a bleed airflow at a different axial location in the turbine engine assembly than the first tap.

In a further embodiment of any of the foregoing, a controller is programmed to control flow of the bleed airflow from one of the first tap and the second tap.

A method of operating a gas turbine engine assembly according to an exemplary embodiment of this disclosure, among other possible things includes generating a high energy gas flow by igniting a fuel mixed with a core airflow, communicating a portion of the core airflow as a bleed airflow through a first tap that is located upstream of a combustor section and downstream of a compressor section of the gas turbine engine assembly, heating the bleed airflow communicated through the first tap with the high energy gas flow within a heat exchanger downstream of the combustor section, and generating shaft power by expanding at least a portion of heated bleed airflow exhausted from the heat exchanger through a power turbine.

In a further embodiment of the foregoing, the method includes exhausting the bleed airflow through an outlet of the power turbine to atmosphere.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 7 is a schematic view of another example turbine engine embodiment.

FIG. 8 is a schematic view of another example turbine engine embodiment.

DETAILED DESCRIPTION

Figure 1:
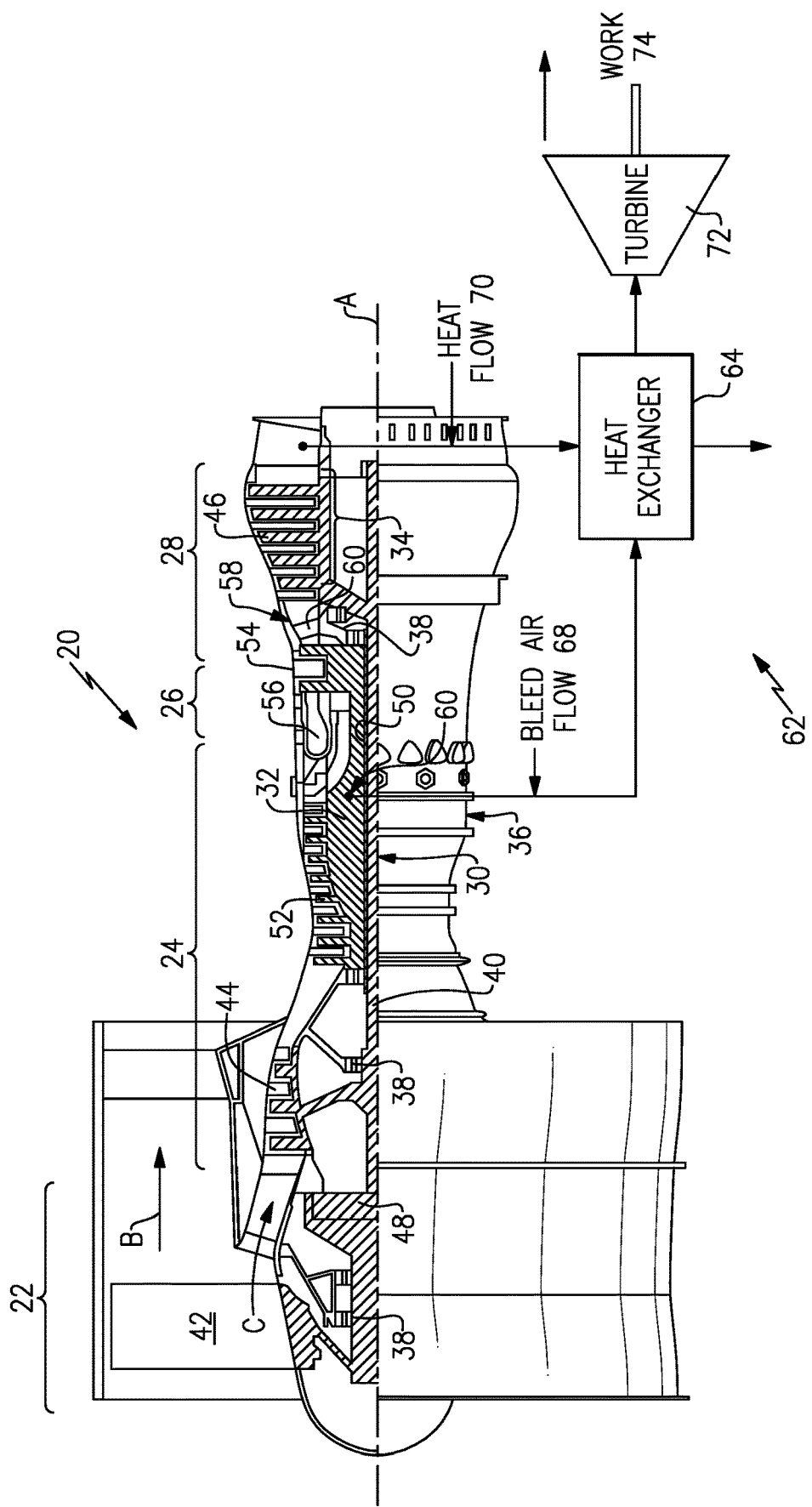
FIG. 1 is a schematic view of an example turbine engine embodiment.

FIG. 1 schematically illustrates an example gas turbine engine 20 that includes a fan section 22, a compressor section 24, a combustor section 26 and a turbine section 28. The fan section 22 drives inlet air 76 along a bypass flow path B, while the compressor section 24 draws air in along a core flow path C where a core airflow 25 is compressed and communicated to a combustor section 26. In the combustor section 26, air is mixed with fuel and ignited to generate a high energy hot exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section.

The example engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

The low-speed spool 30 generally includes an inner shaft 40 that connects a fan 42 and a low-pressure (or first) compressor section 44 to a low-pressure (or first) turbine section 46. The inner shaft 40 drives the fan section 22 through a speed change device, such as a geared architecture 48, to drive the fan section 22 at a lower speed than the low-speed spool 30. The high-speed spool 32 includes an outer shaft 50 that interconnects a high-pressure (or second) compressor section 52 and a high-pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high-pressure" compressor or turbine experiences a higher pressure than a corresponding "low-pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low-pressure turbine 46.

A core airflow 25 through the core airflow path C is compressed by the low-pressure compressor 44 then by the high-pressure compressor 52 mixed with fuel and ignited in the combustor 56 to produce high energy hot exhaust gases that are expanded through the high-pressure turbine 54 and low-pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low-pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°\ R)]0.5$. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low-pressure turbine 46 includes no more than about 6 turbine rotors schematically indicated at 34. In another non-limiting example embodiment, the low-pressure turbine 46 includes about 3 turbine rotors. A ratio between the number of fan blades 42 and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades 42 in the fan section 22 disclose an example gas turbine engine 20 with increased power transfer efficiency.

Thermal energy produced through the combustion process is wasted as the high energy exhaust gas flow is vented to atmosphere after expansion through the turbine section 28. This thermal energy vented to atmosphere can be used to drive other systems to produce power.

The example gas turbine engine 20 includes a waste heat recovery system 62 that utilizes thermal energy from an exhaust gas flow 70 to heat a bleed airflow 68 drawn from a first tap 66. The bleed airflow 68 is directed forward, parallel to the main core flow, until arriving at exhaust heat exchanger 64, where exhaust heat is recuperated into the flow.

The bleed airflow 68 is routed aft of the combustor 56 without being combusted and placed in thermal communication with the hot gas flow 70 within a heat exchanger 64. The heated bleed airflow 68 is communicated to a power turbine 72. The heated bleed airflow 68 expands to through the turbine 72 to rotate a shaft and provide work output schematically indicated at 74. In one example embodiment, the work output 74 drives a shaft that can be coupled to drive a generator, pump, gearbox or any other device utilized to operate engine or aircraft systems. The work produced by the power turbine 72 reduces the load on the core engine and thereby provides increased engine efficiencies.

Figure 2:
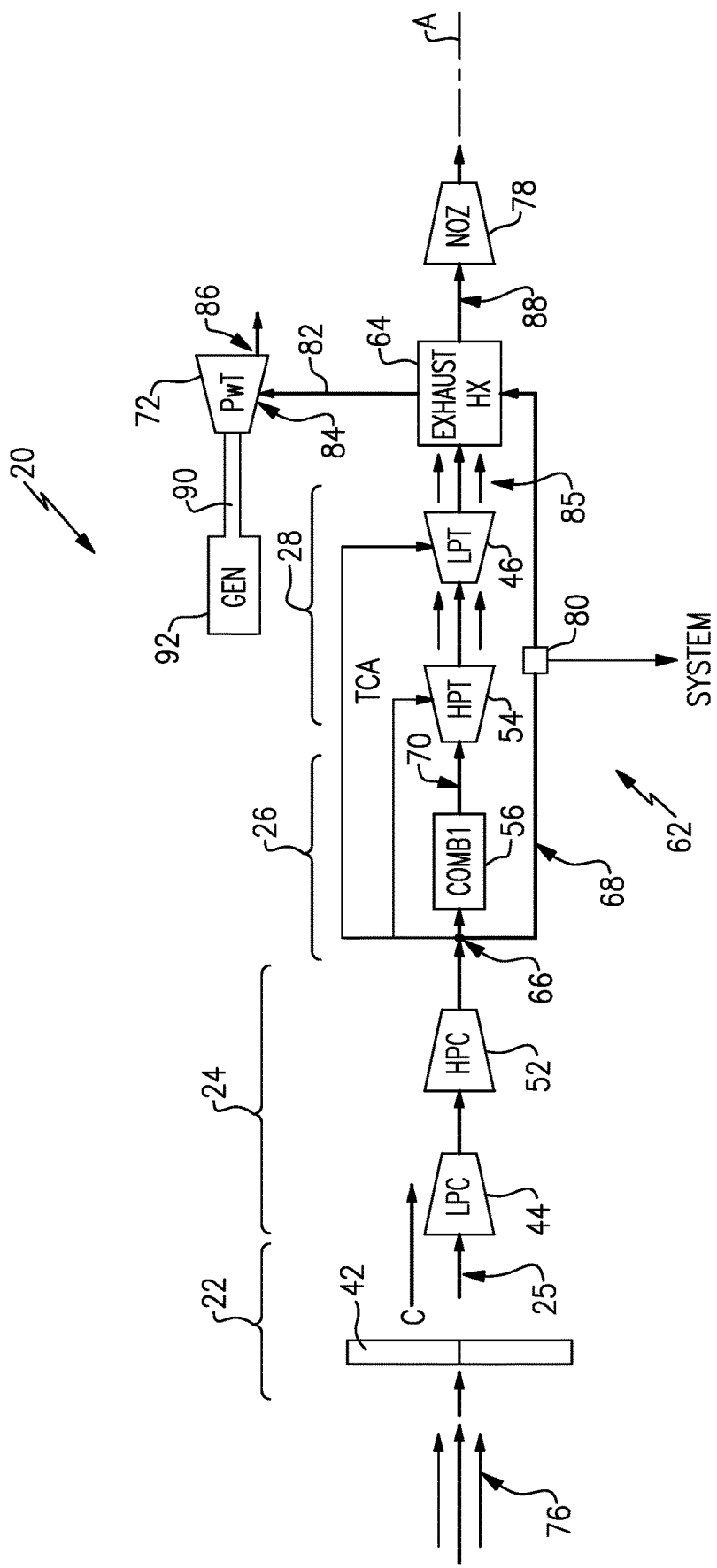
FIG. 2 is a simplified schematic view of the example turbine engine embodiment.

Referring to FIG. 2, with continued reference to FIG. 1, the example engine 20 is shown schematically with the heat exchanger 64 aligned axially along the axis A. In this disclosed example embodiment, the first tap 66 is disposed downstream of the HPC 52 and upstream of the combustor 56. It should be appreciated, that the first tap 66 may be located in other locations that are in flow communication with the core flow path C, such as for example a fan duct or other locations within the compressor section 24 and remain within the scope and contemplation of this disclosure.

The bleed airflow 68 from the first tap 66 is of an increased temperature and pressure due to work performed in the compressor section 24. The pressurized airflow after the HPC 52 provides for the generation of the high energy exhaust gas flow 70. However, much of the energy generated by combustion is vented to atmosphere after expansion through the turbine section 28.

The example heat exchanger 64 is arranged after the last turbine section, that is the low pressure turbine 46 in this example. The heat exchanger 64 may be arranged at different locations within the turbine section 28 and remain within the scope and contemplation of this disclosure. Gas flow exhausted from the turbine section 85 is cooler than the gas flow 70 before expanding through the turbine section, however, useful thermal energy remains in gas flow 85. Gas flow 88 exhausted from the heat exchanger 64 is reduced in temperature compared to gas flow 85, having communicated thermal energy to bleed airflow 68. The exhausted gas flow 88 is directed through an aft nozzle 78 and exhausted to atmosphere.

The heated bleed air indicated at 82 from the heat exchanger 64 is directed to a turbine inlet 84. Expansion of the heated bleed airflow 82 drives the power turbine 72 and is exhausted through a turbine outlet 86 to atmosphere. In this example, the power turbine 72 drives a generator 92 through a shaft 90. The generator 92 produces electric power that can be utilized by any engine or aircraft system. Accordingly, the generator 92 provides for the use of energy that would otherwise simply be vented to atmosphere as waste heat. It should be appreciated that the power turbine 72 may drive other power conversion devise through the shaft 90 and remain within the contemplation and scope of this disclosure. For example, the shaft 90 may be coupled to a hydraulic pump, fuel pump or any other power conversion devise that is operable through a driven shaft.

In one disclosed embodiment, the first tap 66 is upstream of the combustor 56 and downstream of the compressor section 24. However, the first tap 66 may be located in different locations to draw a bleed airflow. For example, the first tap 66 may be located within a fan duct, a location within the LPC 44, within the HPC 52. Moreover, more than one tap may be provided to draw bleed airflow of different pressures as desired. A bleed valve 80 may be provided to provide pressurized air from the bleed air flow 68 to aircraft and/or engine auxiliary systems, such as an environmental controls system.

Figure 3:
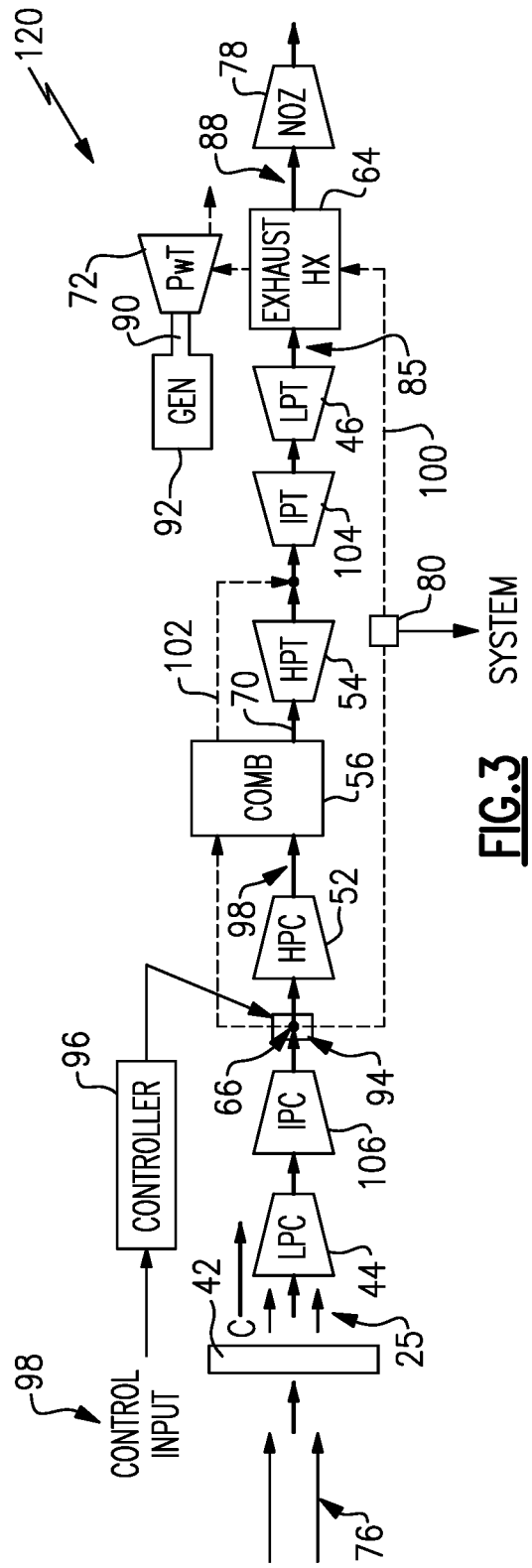
FIG. 3 is a schematic view of another example turbine engine embodiment configured for cruise operation.
Figure 4:
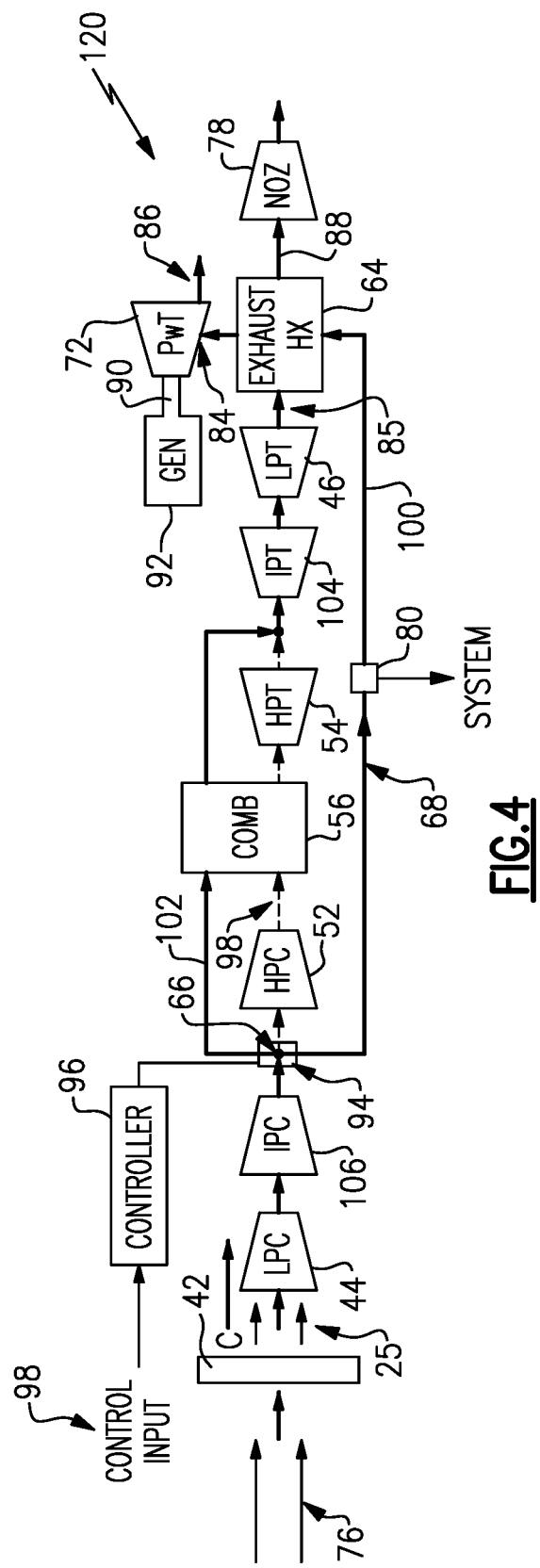
FIG. 4 is a schematic view of the example turbine engine embodiment of FIG. 3 configured for ground operation.

Referring to FIGS. 3 and 4, another engine embodiment is schematically shown and indicated at 120. The example engine 120 includes an intermediate pressure compressor (IPC) 106 and an intermediate pressure turbine (IPT) 104. The IPC 106 and IPT 104 may be coupled by a shaft to define an additional spool. The additional sections provide a different engine architecture that benefits from recovering energy from the waste heat from the combustion process.

In this example, a controller 96 is provided to govern operation of a first valve 94 that is arranged to control bleed airflow from the first tap 66 through one or both of paths 102 and 100. Moreover, in this example engine 120, the first tap 66 is disposed between the IPC 106 and the HPC 52. The bleed airflow 68 may be taken from various locations upstream of the combustor 56 such a between the IPC 106 and the HPC 52.

The controller 96 opens and closes the first valve 94 in response to a control input 98 to provide operation of the engine 120 according to a varying cycle to accommodate different engine operation conditions. In one disclosed example, the first valve 94 is closed to prevent communication of the bleed airflow 68 to the heat exchanger 64 through path 100. With the first valve 94 closed, the engine 120 operates with all of the core airflow 25 proceeding through the combustor 56 as is shown in FIG. 3. In FIG. 3, the engine is operating at a cruise condition and does not provide a forward recuperating bleed airflow 68. In the cruise operating condition, the engine 120 is operating at a high overall pressure rating that corresponds with increased engine operating efficiencies.

In FIG. 4, the engine 120 is shown in an operating configuration corresponding with ground operation. Due to the higher temperature of air at ground level, it is infeasible to operate a turbine engine at the highest overall pressure ratio that is theoretically feasible at cruising altitude. The engine 120 includes a valve 94 that directs bleed airflow 68 along both the path 102 and the path 100 based on engine operating conditions. In the configuration shown in FIG. 4, the valve 94 is open to direct bleed engine flow 68 through the path 100 to the heat exchanger 64 to accept thermal energy that is then communicated to drive the power turbine 72.

In this disclosed example, the first valve 94 also provides a path 102 to bypass the HPC 52 and communicate the bleed airflow from the intermediate pressure compressor 106 directly to the combustor 56. The first valve 94 also provides communication of bleed airflow to the heat exchanger 64 through the path 100. In this disclosed configuration, the engine 120 is operating at a lower overall pressure ratio. The reduced pressure ratio prevents the engine from operating at infeasibly high compression and combustion temperatures while providing power production that matches demand. It should be appreciated, that the valve 94 may control bleed airflow to each of the paths 102 and 100 independently and separately. For example, bleed airflow may be communicated through path 102, but not path 100. Conversely, bleed airflow may be communicated through path 100, but not 102. Additionally, the valve 94 may be arranged to proportionally control bleed airflow through each of the paths 100, 102 to tailor bleed airflows to current engine operating conditions.

Figure 5:
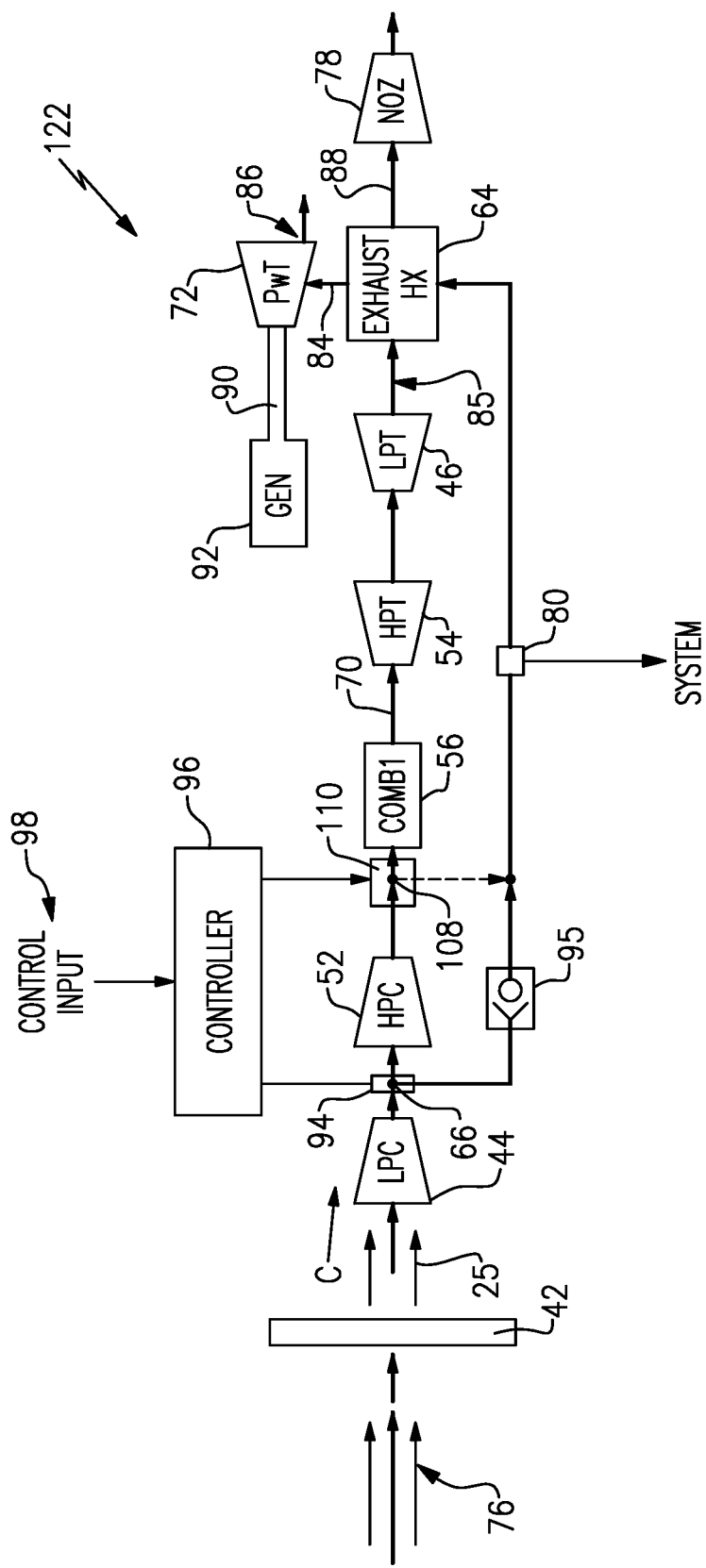
FIG. 5 is a schematic view of another example turbine engine embodiment.

Referring to FIG. 5, another example engine embodiment is schematically indicated at 122. The engine 122 includes a first valve 94 disposed between the LPC 44 and the HPC 52. A second valve 110 is disposed between the combustor 56 and the HPC 52 to control core airflow bleed from a second tap 108. The controller 96 opens and closes the valves 94 and 108 based on a control input 98 to govern bleed airflow to the heat exchanger 64. The valves 94 and 108 provide for switching from what location in the compressor section 24, and thereby what pressure and temperature, the bleed airflow is obtained. Switching points where core bleed airflow is obtained provides for tailoring engine operation and waste heat recover to current engine operating conditions.

A check valve 95 may be provided within the bleed air flow path to prevent back flows. In one disclosed embodiment, the check valve 95 is disposed in a portion of the bleed airflow passage between the LPC 44 and the HPC 52 to prevent high pressure airflows from back flowing upstream toward the LPC 44. It should be appreciated, that additional check valves maybe provided in other locations to control the direction of airflows and prevent undesired back flows.

The core airflow 25 can be tapped based on engine operating conditions as provided by the control input 98. Additionally, the core airflow 25 could be selected based on a predefined engine schedule based on operating conditions, such as takeoff, climb, cruise, decent and taxi conditions. Moreover, although the taps 66 and 108 are shown after each compressor section 44, 52, the taps 66, 108 could be arranged to tap bleed air at a midway point within each compressor section. Moreover, although two taps are shown by way of example, additional taps could be utilized and are within the scope and contemplation of this disclosure.

Figure 6:
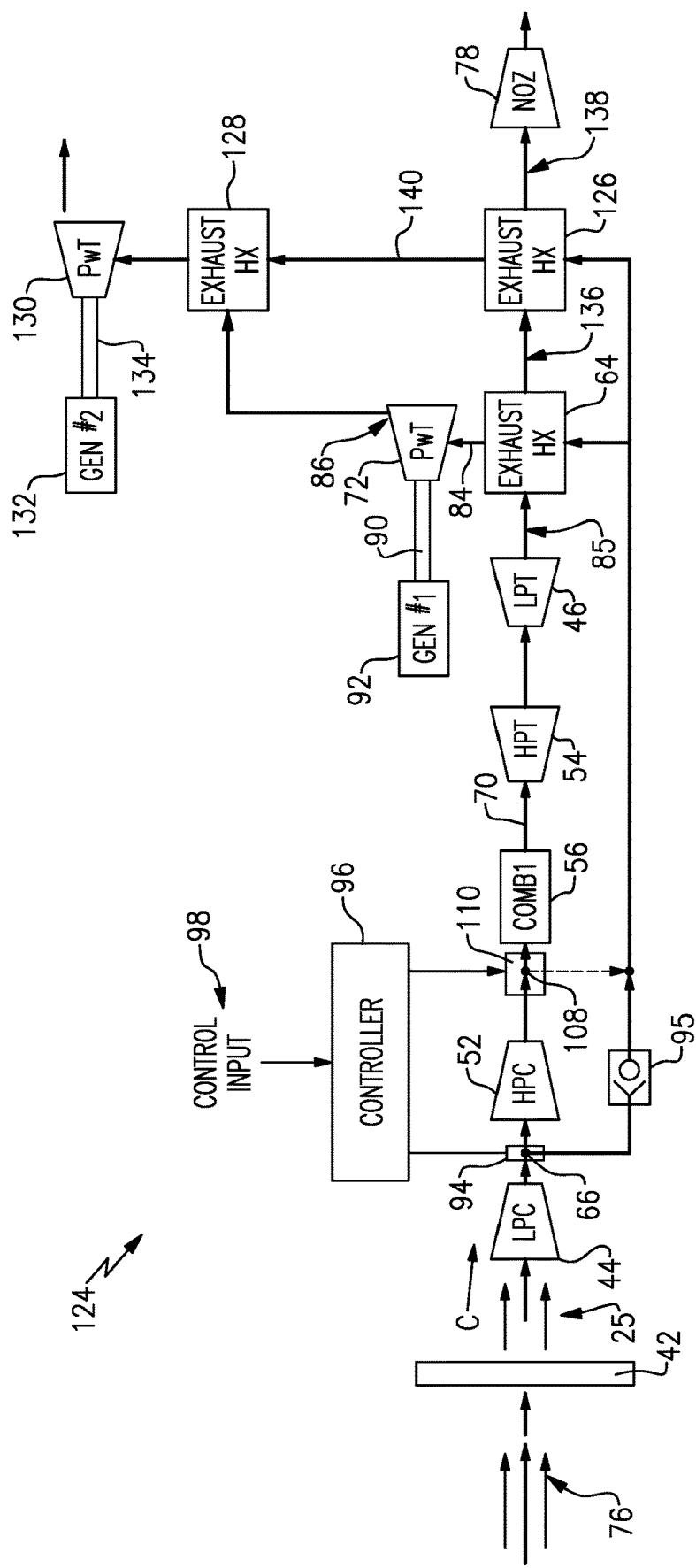
FIG. 6 is a schematic view of another example turbine engine embodiment.

Referring to FIG. 6, another example engine embodiment is schematically indicated at 124 and includes additional heat exchangers 126, 128 that provide heated bleed airflow to a second power turbine 130. In this example, the second power turbine 130 drives a second generator 132 through a second shaft 134.

The example engine embodiment 124 includes the additional heat exchanger 126 aft of the heat exchanger 64 to recover additional thermal energy. As appreciated, although the flow 136 from the first heat exchanger 64 is cooler than the flow 85, the flow 136 still includes thermal energy. That thermal energy is recovered through a heated bleed airflow 140 that is utilized to drive the second power turbine 130. The cooler hot gas flow 138 from the second heat exchanger 126 is exhausted through the core nozzle 78 to atmosphere.

An additional heat exchanger 128 may also be included to recover thermal energy exhausted through outlet 86. The additional heat exchanger 128 communicates additional thermal energy into the bleed airflow 140. The heated bleed airflow is used to drive the second power turbine 130. As appreciated, although a second generator is shown by way of example, other power conversion devices, such as a gearbox, pump or any other shaft driven device could be utilized and are within the scope and contemplation of this disclosure. Moreover, the power turbines 72, 130 may be differently configured and sized to tailor power extraction to the supplied bleed air conditions.

As appreciated, although the example engine 124 includes two power turbines 72, 130, additional power turbines could be utilized and arranged to convert heated bleed airflow into usable shaft power. Moreover, the heat exchangers 64, 126 and 128 may be arranged as required to provide thermal communication between hot gas flow and the bleed airflows.

Referring to FIG. 7 another example engine embodiment is schematically shown and indicated at 150. The engine 150 includes a low or first shaft 152 coupling the LPT 46 to the LPC 44 and a high or second shaft 154 coupling the HPT 54 to the HPC 52. It should be appreciated, that the shafts 152, 154 are schematically shown and would be supported by various bearing assemblies and structures as are known. A first power turbine 156 is coupled to the first shaft 152 and a second power turbine 158 is coupled to the second shaft 154. The first and second power turbines 156, 158 provide an input of additional power to the corresponding one of the first shaft 152 and the second shaft 154. Each of the power turbines 156, 158 are driven by heated bleed air 82 that is heated in the exhaust heat exchanger 64. It should be appreciated, that the location and number of exhaust heat exchangers 64 may be varied with the contemplation of this disclosure. The addition of the power turbines 156, 158 to the shafts 152, 154 provides for the reclaimed energy to be utilized for operation of the engine.

It should be appreciated, that although a power turbine is shown coupled to each of the low shaft 152 and the high shaft 154, a single power turbine may be utilized and coupled only one shaft.

Moreover, the power turbines 156, 158 are schematically shown as directly coupled to a corresponding one of the shafts 152, 154, the power turbines 156, 158 may be selectively coupled to each shaft or coupled through a coupling device such as a gearbox, clutch, electro-mechanical and/or a hydraulic coupling mechanism.

Referring to FIG. 8, an example power turbine coupling embodiment is schematically shown and includes a power turbine 162 receiving a heated bleed airflow 82 and driving a mechanical coupling device 160 to transfer generated shaft power into one of the core engine shafts. In this disclosed example, the core engine shaft is one of the low shaft 152 or the high shaft 154. The coupling device 160 may be a gearbox, clutch mechanism, tower shaft, electro-mechanical, hydraulic coupling or any other link configured to transfer power from the power turbine 162 into one of core engine shafts 152, 154. The power turbine 162 may be selectively input based on engine operating conditions to smooth transition or provide additional power during defined operating conditions.

Accordingly, the disclosed assemblies provide for the advantageous reclamation of heat energy for production of power, improve combustion and thereby improve overall engine efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine assembly comprising:
a core engine including a core flow path where a core airflow is compressed in a compressor section, communicated to a combustor section, mixed with fuel and ignited to generate a high energy combusted gas flow that is expanded through a turbine section;
a first tap at a location up stream of the combustor section for communicating a portion of the core airflow as a bleed airflow downstream of the combustor section;
a heat exchanger placing the bleed airflow communicated from the first tap in thermal communication with the high energy combusted gas flow downstream of the combustor section to generate a heated bleed airflow communicated outside of the core flow path; and
a power turbine disposed outside of the core flow path and configured to generate shaft power from expansion of the heated bleed airflow, the power turbine including an inlet configured to receive the heated bleed airflow from the heat exchanger.

2. The gas turbine engine as recited in claim 1, wherein the compressor section includes a high-pressure compressor disposed upstream of the combustor section and the first tap is located downstream of the high-pressure compressor and upstream of the combustor section.

3. The gas turbine engine as recited in claim 1, wherein the turbine section includes a high-pressure turbine and a low-pressure turbine, wherein the heat exchanger is disposed downstream of the low-pressure turbine.

4. The gas turbine engine as recited in claim 1, including a generator coupled to the power turbine, wherein rotation of the power turbine provided by expansion of the heated bleed airflow drives the power turbine and thereby the generator.

5. The gas turbine engine as recited in claim 1, wherein the power turbine includes an outlet exhausting expanded heated bleed airflow to atmosphere.

6. The gas turbine engine as recited in claim 1, including a first control device configured to control flow of the bleed airflow through the tap, wherein in a first operating condition the first control device prevents flow through the tap and in a second operating condition the first control device provides for flow through the tap.

7. The gas turbine engine as recited in claim 6, including a controller programmed to control operation of the first control device in response to a control input.

8. The gas turbine engine as recited in claim 7, wherein the control input is indicative of an engine operating condition being one of a taxi condition, takeoff condition, a climb condition, a cruise condition or a descend condition.

9. The gas turbine engine as recited in claim 1, including a second power turbine configured to generate shaft power from expansion of a portion of the heated bleed airflow.

10. The gas turbine engine as recited in claim 9, wherein the second power turbine is coupled to drive a power conversion device through a second shaft.

11. The gas turbine engine as recited in claim 2, wherein the compressor section includes a low-pressure compressor upstream of a high-pressure compressor and a second tap disposed at a location downstream of the low-pressure compressor upstream of an outlet of the high-pressure compressor.

12. The gas turbine engine as recited in claim 11, including a first control device to control flow through the first tap and a second control device controlling flow through the second tap and a controller controlling operation of the first control device and the second control device based on a control input.

13. The gas turbine engine as recited in claim 1, wherein the first tap is in communication with a turbine cooling air system and a portion of the bleed airflow is communicated to the turbine cooling air system.

14. The gas turbine engine as recited in claim 1, wherein the power turbine is coupled to a shaft of the core engine.

15. The gas turbine engine as recited in claim 14, including a coupling device configured to couple the power turbine to the shaft of the core engine.

16. An auxiliary power generation system for a turbine engine assembly comprising:
a first tap configured to receive a portion of a core airflow within a core flow path as a bleed airflow and communicate the bleed airflow downstream of a combustor section of a turbine engine assembly;
a heat exchanger placing the bleed airflow communicated from the first tap in thermal communication with a high energy combusted gas flow within the core flow path downstream of the combustor section to generate a heated bleed airflow communicated outside of the core flow path;

a power turbine disposed outside of a core flow path and configured to drive an output shaft from expansion of the heated bleed airflow, the power turbine including an inlet configured to receive the heated bleed airflow from the heat exchanger; and a power generation device coupled to the output shaft of the power turbine.

17. The auxiliary power generation system as recited in claim 16, wherein the power generation device is a generator configured to produce electric power when rotated by the power turbine.

18. The auxiliary power generation system as recited in claim 16, wherein the power turbine is coupled to a shaft of a turbine engine assembly.

19. The auxiliary power generation system as recited in claim 18, including a coupling device configured to couple the power turbine to the shaft of the turbine engine assembly.

20. The auxiliary power generation system as recited in claim 17, wherein power turbine includes an outlet exhausting expanded heated bleed airflow to atmosphere.

21. The auxiliary power generation system as recited in claim 17, including a second tap configured to receive a portion of the core airflow as a bleed airflow at a different axial location in the turbine engine assembly than the first tap.

22. The auxiliary power generation system as recited in claim 21, a controller programmed to control flow of the bleed airflow from one of the first tap and the second tap.

23. A method of operating a gas turbine engine assembly comprising:

generating a high energy gas flow along a core flow path by igniting a fuel mixed with a core airflow;

communicating a portion of the core airflow as a bleed airflow through a first tap that is located upstream of a combustor section and downstream of a compressor section of the gas turbine engine assembly;

heating the bleed airflow communicated through the first tap with the high energy gas flow within a heat exchanger downstream of the combustor section to generate a heated bleed airflow that is communicated outside of the core flow path; and generating shaft power by expanding at least a portion of heated bleed airflow exhausted from the heat exchanger through a power turbine disposed outside of the core flow path.

24. The method as recited in claim 23, including exhausting the bleed airflow through an outlet of the power turbine to atmosphere.

* * * * *